3,058,567
ARTICLE DIVERTER SYSTEM
Richard J. Byrnes, West Allis, Robert N. Eck, Whitefish Bay, and Clyde F. Robbins and Norbert Sadowski, Milwaukee, Wis., assignors to Cutler-Hammer, Inc., Milwaukee, Wis., a corporation of Delaware
Filed June 21, 1960, Ser. No. 37,611
16 Claims. (Cl. 198—20)

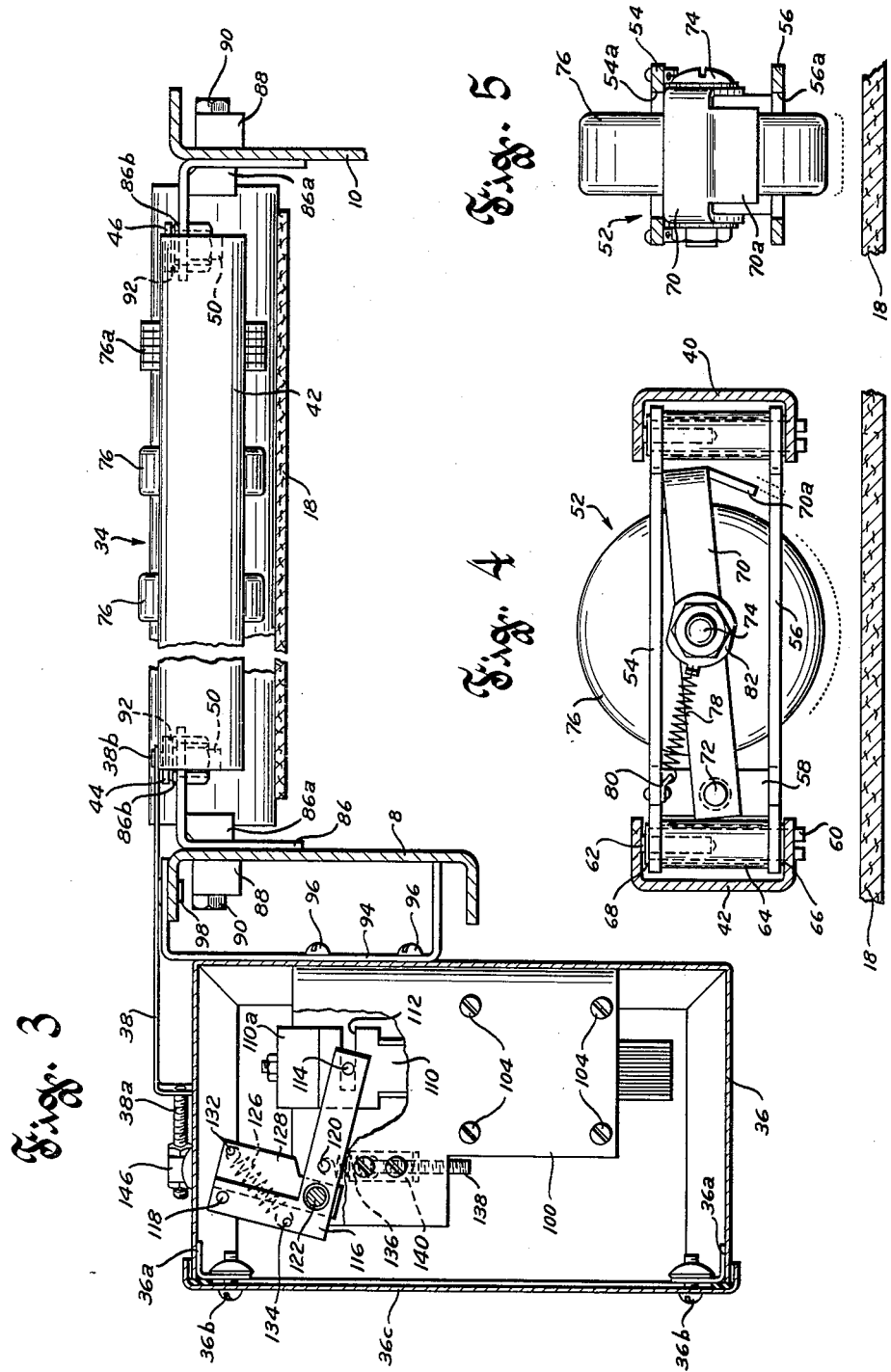

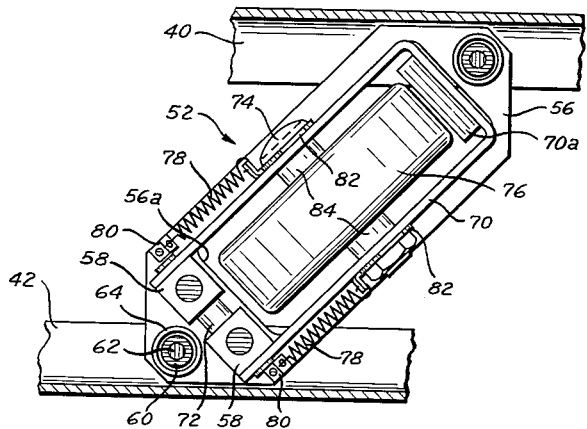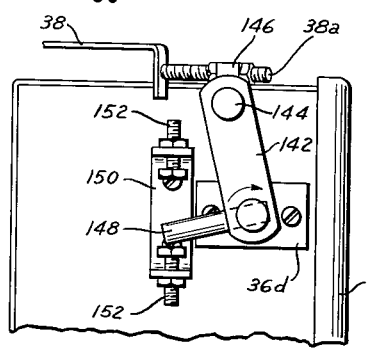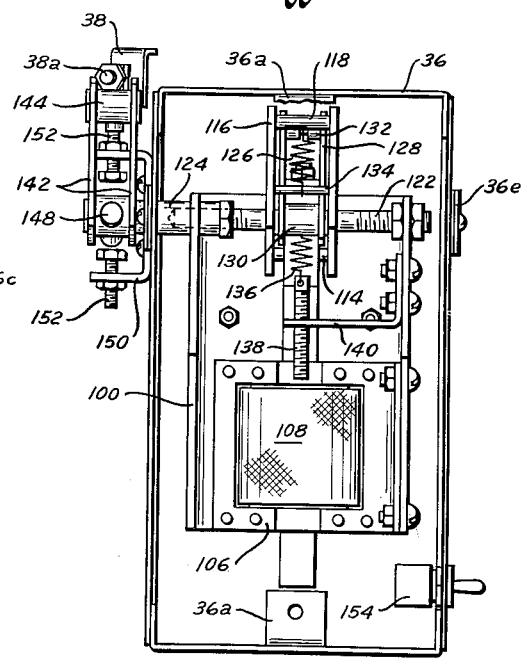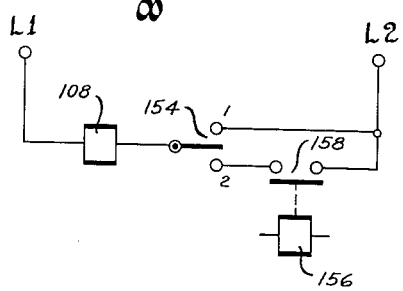

This invention relates to article diverter systems and more particularly to mechanisms for turning and diverting moving articles from a conveyor.

While not limited thereto, the invention is especially applicable to roller conveyors of the belt driven type or the like for diverting the thing being conveyed such as an article or article tray from a main conveyor to a branch conveyor which is at a substantially right angle or parallel with the main conveyor.

An object of the invention is to provide an improved article diverter system for a conveyor.

Another object of the invention is to provide an improved diverter device which is capable of turning and diverting an artcile or article tray from a main conveyor to a branch conveyor and wherein the branch conveyor may be at any angle between a right angle and parallel relation with the main conveyor.

Another object of the invention is to provide such diverter device which significantly increases the rate at which trays are diverted from one conveyor to another.

Another object of the invention is to provide such diverter device which can be mounted in place of a roller or between a pair of rollers at any desired point along a conveyor without substantial modification of the latter.

Another object of the invention is to provide such diverter device which is selectively and electrically operable between non-diverting and diverting positions for selectively turning and diverting articles or article trays of a series thereof which are spaced relatively close to one another substantially frictionlessly and without interference with one another from one conveyor to another.

A further object of the invention is to provide such diverter device which is simple and economical in construction, quickly installed or replaced for repair or maintenance without stopping the conveyor system and efficient and reliable in operation.

In accordance with the invention, there is provided a tray diverter mounted across a main conveyor at a point immediately adjacent the entry side of the branch conveyor substantially in line with the side rail of the latter and having an electrical operating mechanism mounted on the side rail of the main conveyor opposite to the branch conveyor. The diverter is provided with an elongated supporting structure of the parallelogram type having means at its ends for supporting the same in the opposite side rail notches normally accommodating the axle ends of a roller. Thus, the diverter can be mounted in place of a roller and also is sufficiently narrow to be received between a pair of adjacent rollers in suitable notches to be provided. A single row of diverter wheels of the skate wheel type or the like are rotatably supported between the side channels of the parallelogram and are individually pivoted on the parallelogram and are spring biased upwardly slightly above the upper level of the adjacent conveyor rollers. Each centrally pivoted end bar of the parallelogram is provided with a hole adjacent either end thereof for selectively journaling an operating member extending thereto from the operating mechanism to selectively arrange the wheels for pivoting either to the left or the right and to afford actuation of the diverter from either end. Moreover, each wheel assembly is provided with means permitting depression of the wheel in its non-diverting position and restricting depression thereof in its diverting position to postively maintain the wheels in engagement with the bottom of the tray.

The above mentioned and other objects and advantages of the invention and the manner of obtaining them will best be understood by reference to the following detailed description of an exemplary embodiment of an article diverter system taken in conjunction with the accompanying drawings, wherein:

FIG. 3 is an enlarged cross-sectional view taken along lines 3—3 of FIG. 1 showing the diverter mechanism in front elevation and with the front portion of the housing removed to show the diverter operating mechanism;

FIG. 4 is an enlarged cross-sectional view taken along lines 4—4 of FIG. 2 showing a side elevational view of a diverter wheel assembly;

FIG. 5 is an enlarged cross-sectional view taken along lines 5—5 of FIG. 2 showing a rear elevational view of a diverter wheel assembly;

FIG. 6 is an enlarged top view partly in section showing a wheel assembly in a diverting position;

FIG. 7 is an enlarged left end elevational view of the operating mechanism of FIG. 1 with the cover from the housing removed;

FIG. 8 is an enlarged fragmentary rear elevational view of the upper portion of the operating mechanism of FIG. 1; and FIG. 9 diagrammatically shows an operating circuit for the diverter operating mechanism of FIG. 1.

Figure 1:
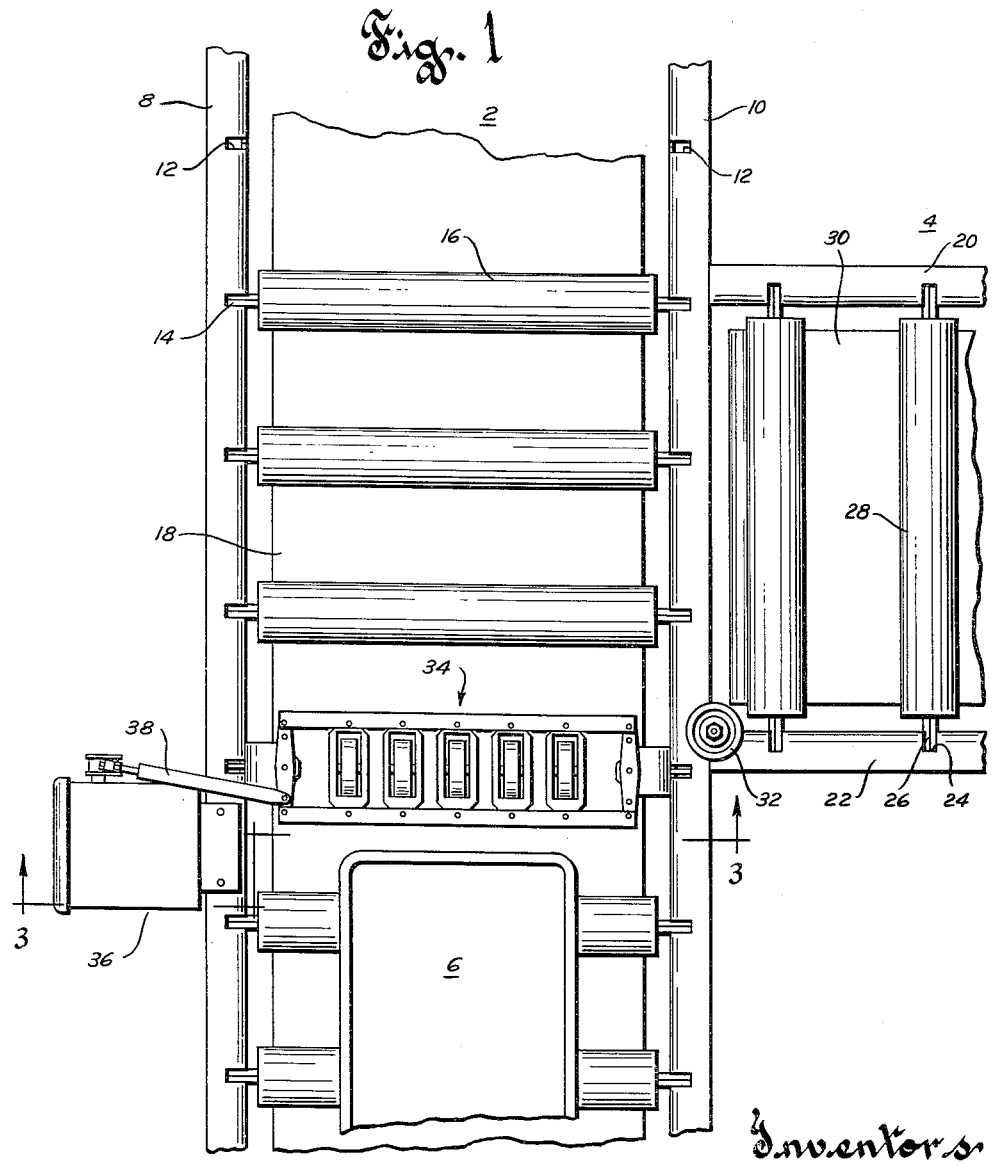
FIGURE 1 is a schematic illustration of a conveyor system layout showing portions of a main conveyor and a branch conveyor and a diverter mechanism mounted across the main conveyor at the junctions of the branch conveyor therewith.

Referring to FIG. 1, there is shown an article conveyor system comprising a main conveyor 2 and a branch conveyor 4, the latter extending from the right-hand side of the main conveyor at a right angle. The conveyors are of the well known belt driven roller type and are adapted for conveying an article or article carrier such as, for example, a tray 6 or the like. Main conveyor 2 is provided with a pair of generally shallow U-shaped support or frame members 8 and 10 arranged on edge with the bottoms of the U-shaped members arranged in opposed relation to form side rails for the conveyor. The upper inner corners of frame member 8 and 10 are provided with equally spaced open top slots or notches 12, each notch on member 8 being in lateral alinement with a corresponding notch or member 10 and each such pair of alined notches being adapted to accommodate and securely support the ends of an axle 14 of a conveyor roller 16. The ends of axle 14 are of hexagonal cross-section or may be provided with suitable flat or partially flat sides to be held against rotation in their associated notches 12 whereas roller 16 is mounted for free rotation on the axle. It will be apparent that rollers 16 are held in their respective positions by gravity and that each such roller may be freely lifted from its notches if it is desired to remove the same. Rollers 16 are frictionally driven by an endless motor driven belt 18. In conveyors of this type, a plurality of idler rollers, not shown, are mounted below belt 18 and these idler rollers are staggered relative to rollers 16 to support the belt flat and at the proper height whereby rollers 16 float on the belt. The weight of rollers 16 maintain the same in frictional driven engagement with the belt.

Similarly, brach conveyor 4 is provided with a pair of like spaced frame members 20 and 22, each having notches 24 for receiving the ends of axles 26 of a plurality of spaced rollers 28. These rollers float on and are frictionally driven by an endless motor driven belt 30 and a plurality of freely rotatable idler rollers, not shown, are mounted in a suitable manner below belt 30 for supporting the belt flat and at the proper height. A freely rotatable guide wheel 32 is journaled on the end of frame member 22 at the entry side of branch conveyor 4 for guiding tray 6 as it turns from the main conveyor to the branch conveyor.

While branch conveyor 4 is illustrated as being at a right-angle to main conveyor 2, it will be apparent that it could as well be in adjacent parallel arrangement with the main conveyor or at any desired obtuse angle between such parallel and right-angle positions. Also, branch conveyor 4 could be arranged in any of these positions on the left-hand side of main conveyor 2.

Main conveyor 2 is provided with a diverter device 34 arranged thereacross immediately adjacent the entry side of the branch conveyor as shown in FIG. 1. This diverter device is mounted in place of one conveyor roller in the notches 12 thereof. However, it is understood that diverter device 34 could as well be mounted between a pair of adjacent rollers in suitable notches provided therefor. An operation mechanism having a housing 36 is secured to frame member 8 externally of the main conveyor and is provided with an operating member 38 extending therefrom to diverter device 34 for actuating the latter from its straight ahead non-diverting position to its diverting position at an angle of substantially 45 degrees toward branch conveyor 4.

Figure 2:
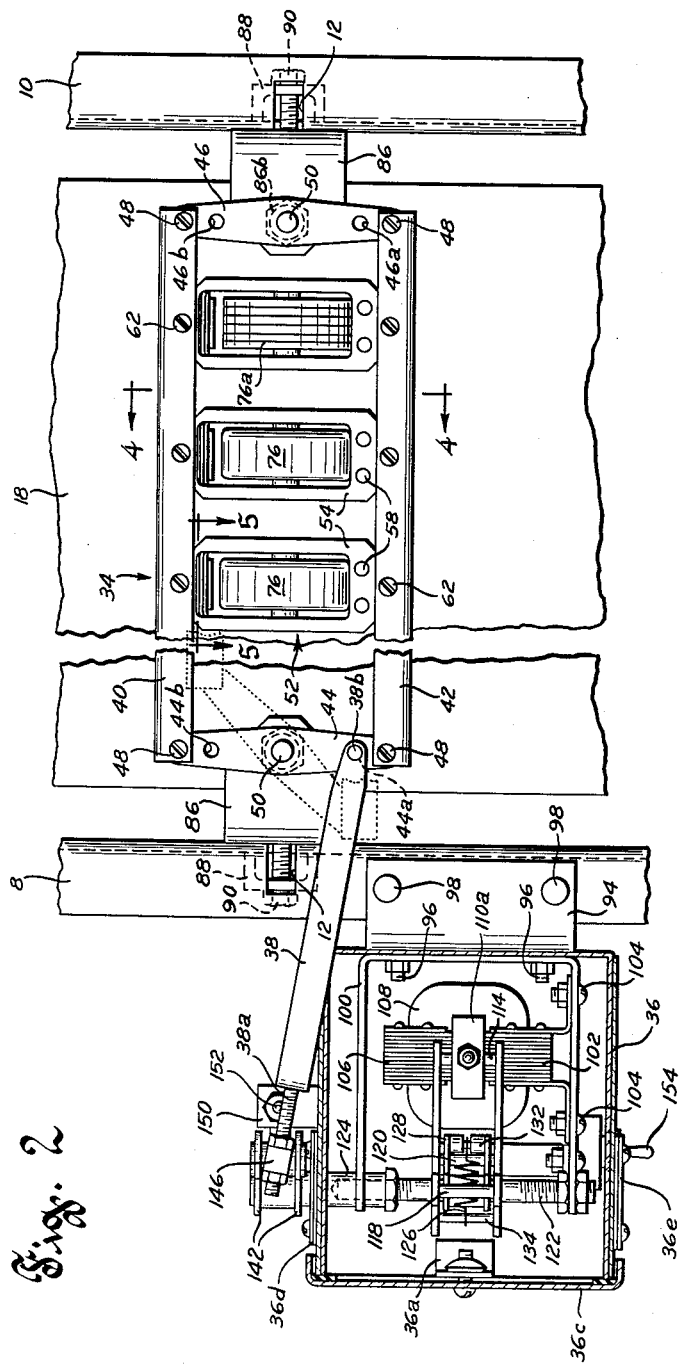
FIG. 2 is an enlarged top view of the diverter mechanism and a portion of the main conveyor of FIG. 1 with the upper portion of the housing removed to show the diverter operating mechanism.

As shown in FIGS. 2 and 3, diverter device 34 is provided with a supporting structure in the nature of an actuable link-type parallelogram comprising a pair of spaced apart, elongated and substantially shallow channel-shaped side members 40 and 42 and a pair of substantially shorter flat end members 44 and 46. Each side member 40 and 42 has a horizontal U-shaped configuration in transverse cross section, as more clearly shown in FIG. 4, providing upper and lower spaced apart flanges extending parallel to one another from the vertical yoke portion thereof. Side members 40 and 42 are arranged in spaced apart relation as shown in FIG. 2 so that the flanges of member 40 extend horizontally toward the flanges of member 42. The opposite ends of the upper flanges of members 40 and 42 are provided with round holes extending vertically therethrough and the opposite ends of end members 44 and 46 are provided with similar holes in alinement with the respective holes on the upper flanges of members 40 and 42. The upper flanges of members 40 and 42 rest on the respective ends of end members 44 and 46 and the four members are pivotally secured to one another at their ends by suitable means such as bolts 48 or the like extending through the pairs of alined holes to form an actuatable parallelogram. Each end member 44 and 46 has rigidly secured to its mid-portion a depending bearing pin 50 for supporting the same for rotation about a vertical axis as hereinafter described. The upper and lower flanges of side members 40 and 42 are also provided with a plurality of equally spaced holes with each such hole in the upper flange of each member being in vertical alinement with a corresponding hole in the associated lower flange of each member to provide opposed pairs of holes in the two side members for pivotally supporting in parallel relation a plurality of wheel assemblies 52 therebetween as hereinafter described.

As shown in FIGS. 2 and 4, each wheel assembly 52 is provided with upper and lower spaced apart supporting brackets 54 and 56, respectively. Each such bracket is flat and has a generally rectangular configuration with the four corners thereof cut off at angles of substantially 45 degrees so that the opposite edges of each end of each bracket converge toward one another and terminate in spaced apart relation at the end of the bracket. These converging edges are provided at each end of each bracket to avoid interference between these brackets and side members 40 and 42 when the diverter device is actuated to a diverting position as shown in FIG. 6. Brackets 54 and 56 are rigidly secured to one another in vertically spaced apart relation by a pair of horizontally spaced parallel rivets 58 extending therebetween. Each rivet 58 has a square cross-section along its length and is provided with reduced round end portions affording a pair of spaced apart shoulders for spacing brackets 54 and 56 from one another. The corresponding reduced end portions of rivets 58 extend through pairs of holes in brackets 54 and 56, the holes of each such pair being in laterally spaced apart relation and being also spaced from the end of the associated bracket. The reduced end portions of rivets 58 are externally riveted to rigidly secure brackets 54 and 56 to one another to form a bracket assembly.

A pivot pin 60 shown in FIGS. 4 and 6 extends through each aperture in the lower flanges of side members 40 and 42 to a point slightly short of the upper flanges of the side members and is provided at its upper end with a co-axial tapped hole for threadedly receiving a screw extending through the corresponding alined hole in the upper flange. The extreme ends of brackets 54 and 56 are provided with alined holes for receiving pin 60 therethrough to pivotally support the opposite ends of the bracket assembly between the upper and lower flanges of side members 40 and 42. A sleeve 64 surrounds pin 60 between brackets 54 and 56. A first washer 66 surrounds pin 60 between the lower flange and bracket 56 and another washer 68 surrounds screw 62 between bracket 54 and the upper flange of the side member.

As shown in FIGS. 4, 5 and 6, a generally horizontal U-shaped lever 70 extends between brackets 54 and 56 and is pivotally supported on rivets 58. To this end, each rivet 58 is provided with a transverse hole substantially at the mid-portion thereof, the holes of each pair of rivets being in alinement for receiving a pivot pin 72 extending therethrough. Pivot pin 72 is provided with a substantially enlarged mid-portion extending through the holes in rivets 58 and reduced end portions extending through substantially smaller holes in the free end portions of the legs of lever 70 thereby to pivotally support lever 70 for restricted pivotal movement between brackets 54 and 56. The mid-portion of the two legs of lever 70 are provided with alined holes for receiving a bolt 74 or the like extending therethrough and through a diverter wheel 76 for supporting wheel 76 for free rotation on a horizontal axis between the legs of lever 70.

Two helical tension springs 78, shown in FIGS. 4 and 6, are connected between bracket 54 and bolt 74 to normally resiliently bias diverter wheel 76 into its upper position wherein the yoke end of lever 70 stops against upper bracket 54. To this end, a connecting member 80, shown in FIG. 4 is riveted onto the lower side of bracket 54 adjacent each edge of such bracket externally of rivets 58. Bracket 54 is removed in FIG. 6 to show member 80. Each such connecting member 80 is provided with a downwardly bent portion having a hole therein for receiving one end hook of spring 78. A pair of apertured washer-like connecting members 82 surround bolt 74, one such member being between the head of the bolt and a first leg of lever 70 and the other such member being between the second leg of lever 70 and the nut which is threaded on the end of the bolt. Each such connecting member 82 is provided with an outwardly bent extension having a hole therein for receiving the other end hook of spring 78. A pair of sleeves 84 surround bolt 74, one such sleeve being on each side of wheel 76 to space the latter from the opposite legs of lever 70.

As shown in FIGS. 5 and 6, brackets 54 and 56 are provided substantially centrally therof with alined, generally rectangular apertures 54a and 56a to provide clearance for the upper and lower portions of wheel 76 which portions of the wheel extend through the respective apertures. The yoke portion of lever 70 is provided with an angular depending inwardly bent portion 70a for engaging the lower flange of side member 40 when the diverter device is in its diverting position as shown in FIG. 6 thereby to prevent depression of diverter wheel 76 below the level of the adjacent conveyor rollers. The inward bend of portion 70a also provides a cam surface on either side ledge thereof for engaging the lower flange of side member 40 to cause the diverting wheel to be raised when the mechanism is actuated to a diverting position under load.

As shown in FIGS. 2 and 3, a pair of generally inverted L-shaped angle brackets 86 are provided for supporting diverting mechanism 34 on frame members 8 and 10 of the conveyor. Each angle bracket 86 has a vertical portion detachably secured to the associated frame member of the conveyor and a horizontal portion for supporting one end of diverter device 34. A generally rectangular block 86a having a horizontal threaded hole therethrough is rigidly secured as by welding within the angle of each bracket 86 and the upper part of the vertical portion of each such bracket is provided with a suitable hole in alinement with such threaded hole. As more clearly shown, in FIG. 2, a U-shaped clamping member 88 and a bolt 90 are provided for rigidly securing each bracket 86 to its associated conveyor frame member. Member 88 is arranged so that the ends of its legs bear against the conveyor frame member and the yoke portion of member 88 is provided with a hole for receiving bolt 90 therethrough and through slot 12 in the conveyor frame member and the hole in bracket 86 into threaded engagement in the hole in block 86a to rigidly secure bracket 86 to the conveyor frame member. The horizontal portion of each bracket 86 is provided with an oblong hole in a direction transversely of the conveyor for adjustably receiving a tubular bearing 86b having a flange at its upper end resting on bracket 86 and the tubular portion thereof depending below the bracket being externally threaded for receiving a nut to clamp the bearing onto bracket 86 in a laterally adjustable position. Pivot pin 50 of each end member 44 and 46 of diverter device 34 is journaled in such bearing and held therein by gravity and a thrust washer 92 or the like is provided between each end member and the upper flange of the bearing to afford free rotation of the end member on the bracket.

One or more diverter wheels 76 may be provided with a cover or tire 76a of rubber material or the like for enhancing the frictional engagement between the diverter wheel and the tray. Preferably, the diverter wheel nearest the branch conveyor is of smaller diameter and is provided with a tire having a diameter equal to the diameter of the uncovered wheels.

Referring to FIGS. 2, 3, 7 and 8, there is shown an electromagnetic operating mechanism for actuating diverter device 34 between non-diverting and diverting positions. As shown in FIGS. 2 and 3, housing 36 has secured externally thereof to the upper portion of the right-hand wall thereof a U-shaped bracket 94 by a plurality of bolts 96 or the like. The upper flange of bracket 94 rests on the upper flange of conveyor frame member 8 and is removably secured to the latter by a pair of pins 98 or the like extending into suitable holes in the upper flange of the conveyor frame member. The lower flange of bracket 94 bears against conveyor frame member 8 slightly above the lower flange of the latter. The left-hand wall of housing 36 is open and the top and bottom walls of the housing have secured centrally thereof on the interior of the housing a pair of brackets 36a extending into the housing opening. Each such bracket 36a is provided with a threaded hole for receiving a screw 36b or the like for securing a gasketed cover 36c to close the opening in the housing. Bolts 96 which secure bracket 94 of the housing are also employed to rigidly secure within the housing a U-shaped supporting bracket 100 having a pair of legs extending into the interior of the housing. An electromagnet 102 is secured within bracket 100 onto one leg of the latter by bolts 104 or the like. Electromagnet 102 is provided with a core 106, a coil 108 and an armature 110 of the plunger type. Armature 110 is arranged to move upwardly when the electromagnet is energized and is provided with a horizontal slot 112 for accommodating the cross pin 114 of an actuating crank 116, such horizontal slot in the armature affording translation between the linear motion of armature 110 and the rotary motion of crank 116. A suitable weight 110a is secured to the upper end of armature 110 to afford return of the armature to its normal position under the force of gravity when the electromagnet is deenergized.

Crank 116, shown in FIGS. 3 and 7, comprises a pair of L-shaped members rigidly secured to one another in spaced relation by a pair of rivets 118 and 120 and pin 114 which is also in the nature of a rivet. Crank 116 is rotatably supported within bracket 100 on a fixed pivot comprising a shaft 122, more clearly shown in FIG. 7, extending between the legs of bracket 100. Shaft 122 extends through suitable alined holes at approximately the mid-portions of the L-shaped members of crank 116 freely to pivot the latter thereon. Shaft 122 is threaded at each end and is rotatably journaled at one end on a leg of bracket 100. To this end, a short bushing surrounds the journaled end of shaft 122 which bushing is engaged on each end thereof by a suitable nut and such bushing rotates in a complementary hole in the leg of bracket 100 and the bushing serves to space the nuts from one another to afford free rotation of the shaft on the bracket. The other end of shaft 122 is threaded in an axial hole in one end of an operating shaft 124, this end of shaft 122 being provided with a locking nut to rigidly secure shafts 122 and 124 to one another. Shaft 124 extends through suitable alined holes in the other leg of bracket 100 and in the rear wall of housing 36 to the exterior of the housing. Crank 116 is resiliently secured to shaft 122 through a helical tension spring 126 and a lever 128.

Lever 128, shown in FIGS. 3 and 7, comprises a pair of elongated flat members rigidly secured to one another in spaced apart parallel relation adjacent one end thereof by a sleeve 130, each such member also having a suitable hole in alinement with the hole through the sleeve. Sleeve 130 surrounds shaft 122 within the sides of crank 116 and is rigidly secured to shaft 122 by a radial set screw or the like. A pin 132 extends between the other ends of the elongated members of lever 128 and is provided with an annular groove at the mid-portion thereof for accommodating one end hook of spring 126. The other end hook of spring 126 engages a pin 134 rigidly secured to and extending between the L-shaped members of crank 116. Spring 126 is of a length to normally maintain lever 128 resiliently in engagement with rivet 118 or crank 116. Rivet 120 which extends between the L-shaped members of crank 116 between shaft 122 and armature engaging pin 114 is provided with an angular groove centrally thereof for engaging one end hook of an adjusting return spring 136. The other end hook of spring 136 is secured to the upper end of an adjustable threaded shaft 138. A bracket 140 is rigidly secured to one leg of bracket 100 and extends horizontally therefrom and is provided at its free end with a threaded hole for receiving shaft 138. As will be apparent, shaft 138 may be adjusted on bracket 140 to maintain the proper bias on spring 136.

As more clearly shown in FIGS. 2, 7 and 8, the rear wall of housing 36 is provided with a rectangular reenforcing plate 36d secured thereto by screws or the like and having a suitable hole therethrough in alinement with a corresponding hole in the rear wall of housing 36 for journaling shaft 124. The external end of shaft 124 is provided with an enlarged portion short of the external end thereof and a pair of elongated crank members 142 are rigidly secured as by welding at one end thereof to opposite sides of this enlarged portion, each such crank member 142 having a suitable hole for accommodating shaft 124. The other end of members 142 are provided with suitable alined holes for accommodating a rotatable member 144 having an enlarged mid-portion for spacing crank members 142 from one another. Member 144 is provided with a transverse hole centrally thereof for receiving an enlarged-head pin 146. The extreme end of the shank of pin 146 may be provided with a transverse hole or the like for receiving a cotter pin to rotatably secure pin 146 in the hole in member 144. The enlarged head of pin 146 is preferably cubical and is provided with a transverse hole for receiving one end of a threaded shaft 38a rigidly secured at its other end to the bent end portion of operating member 38. A pair of nuts are threaded on shaft 38a on opposite sides of the enlarged head of pin 146 to rigidly secure the same to one another and to afford adjustment of the length of operating member 38 extending to diverter device 34. The other end of operating member 38 is provided with a depending pin 38b which extends through one of the holes 44a or 44b adjacent the respective ends of end member 44 of the diverter device. Depending pin 38b may be provided at its lower end below end member 44 with suitable means such as a transverse hole and a cotter pin or the like for preventing the pin from rising out of engagement with member 44.

The front wall of housing 36 is provided with a hole in alinement with shaft 124 and corresponding to the hole in the rear wall of the housing wherein shaft 124 is journaled. As shown in FIGS. 2 and 7, the hole in the front wall is normally covered by a cover plate 36e secured thereto by a pair of screws or the like. When plates 36d and 36e are interchanged, shafts 122 and 124 can be reversed whereby the housing can be mounted on the other side of operating member 38.

It will be apparent from FIG. 2 that when operating member 38 is connected to hole 44a in end member 44 in the manner shown, energization of the electromagnet will cause member 38 to move in the left-hand direction and to rotate member 44 in the clockwise direction to the dotted line position thereby to pivot the diverter wheels in the clockwise direction. When operating member 38 is connected to the other hole 44b in member 44, such energization of the electromagnet will again cause operating member 38 to move in the left-hand direction but this time member 44 will be rotated in the counterclockwise direction to pivot the diverter wheels in the counterclockwise direction. It will be apparent that the pivot point of operating member 38, that is pin 146, is preferably directly in line with pivot pin 50 of the diverter device so that pin 38b of the operating member can be assembled in either hole 44a or hole 44b in member 44. Also limited adjustment of diverter device 34 in the left-hand or right hand direction as seen in FIG. 2, is afforded by the oblong holes in supporting brackets 86.

As shown in FIGS. 7 and 8, the enlarged portion of shaft 124 is provided with a transverse hole into which a laterally extending pin 148 is rigidly secured as by friction fitting threading or the like. The free end of pin 148 extends between the legs of a U-shaped stop bracket 150 having its yoke portion rigidly secured to the rear wall of housing 36 by a pair of screws or the like. Each leg of bracket 150 is provided with a threaded hole for receiving an outwardly threaded screw 152 having a locking nut externally of the bracket leg and the heads of such screws forming adjustably spaced stops for pin 148. As will be apparent, the lower screw 152 affords adjustment of the normal straight ahead position of the diverter wheels whereas the upper screw 152 affords adjustment of the angle to which the diverter wheels can be actuated under the control of the electromagnet.

As shown in FIGS. 2 and 7, a double throw toggle switch 154 is mounted at the lower portion of the front wall of housing 36, this switch being also shown schematically in FIG. 9. Switch 154 is provided with a movable contact and a pair of stationary contacts 1 and 2. The movable contact is connected through coil 108 of the electromagnet to line L1 which is connectable to one side of a power supply source. Stationary contact 1 is connected directly to line L2 which is connectable to the other side of the power supply source. A control relay 156 having a normally open contact 158 is provided for connecting stationary contact 2 to line L2. Thus, it will be apparent that closure of the normally open movable contact of switch 154 to stationary contact 1 will afford manual control of the energization of coil 108 and, thus, manual control of the actuation of the diverter device. When the movable contact of switch 154 is set on stationary contact 2 energization of coil 108 and actuation of the diverter device is under the control of relay 156 thereby to afford automatic control. For a more detailed description of an automatic control system for operating a relay such as relay 156, reference may be had to Richard J. Byrnes, James T. Pence and Barney O. Rae copending application Serial No. 37,762, filed June 21, 1960, now Patent No. 3,011,621, and assigned to the assignee of the present invention.

To operate the diverter device hereinbefore described under manual control, switch 154 is actuated to contact 1 to energize coil 108. As a result, armature 110 moves upwardly according to FIG. 3 and rotates crank 116 in the counterclockwise direction. Lever 128 being connected to crank 116 through tension spring 126, lever 128 is also rotated in the counterclockwise direction and rotates shafts 122 and 124 therewith. Shaft 124 rotates crank 142 thereby to move operating lever 38 in the left-hand direction according to FIG. 2. As a result, end members 44 and 46 of the diverter device are rotated clockwise and side members 40 and 42 move in the right-hand and left-hand directions, respectively, and also move inwardly to rotate the diverter wheels clockwise to an angle of substantially 45 degrees. Rotation of the diverter wheels in either direction causes a corner of depending portion 70a of wheel supporting lever 70 to move over the lower flange of side member 40 as illustrated in FIG. 6. As a result when a tray moves over the diverter wheels, depression of the wheels is limited to keep the wheels out of engagement with belt 18 as the wheels rotate in a different direction in their diverting position to turn and divert the tray from the main conveyor onto the branch conveyor. When switch 154 is returned to its normally open position, coil 108 is deenergized and weight 110a rotates crank 116 in the clockwise direction as seen in FIG. 3, this return force being adjustable by spring 136. Rivet 118 of crank 116 bears against the upper end of lever 128 to correspondingly rotate the latter in the clockwise direction. As a result, operating member 38 is moved in the right-hand direction to resore the diverter mechanism from its diverting position shown in dotted lines in FIG. 2 to its normal straight ahead position shown in solid lines. In their normal straight ahead position, diverting wheels 76 may be depressed by a tray against the force of bias springs 78 to engage belt 18 whereby the diverting wheels drive the tray in a manner similar to the conveyor roller which was replaced thereby.

When switch 154 is set on contact 2 the diverter device is actuated in a similar manner under the control of relay 156 and its contact 158.

The resilient connection comprising spring 126 is provided to allow actuation of armature 110 to its full extent in the event a tray is resting on the diverter wheels when coil 108 is energized and thereby prevent damage to or burnout of the coil. Thus, energization of coil 108 when the tray is resting on the diverter wheels causes upward movement of armature 110 and counterclockwise rotation of crank 116. Lever 128 may remain in the position shown in FIG. 3 under the force of the tray resting on the diverter wheels. However, crank 116 rotates on shaft 124 against the force of spring 126. When the tray moves off the diverter wheels, spring 126 rotates lever 128 counterclockwise to actuate the diverter wheels to their diverting position.

When coil 108 is deenergized, weight 110a causes armature 110 to move downwardly under the force of gravity. Weight 110a affords a return force substantially similar to the actuating force provided by the electromagnet. Spring 136 and threaded shaft 138 are provided to facilitate adjustment of the return force to a value sufficient to restore the diverting device.

Alternatively, the operating mechanism can be mounted on the other side of main conveyor 2 adjacent the opposite end of the diverter device on either side of operating member 38. In this position, pin 38b of operating member 38 may be connected to either hole 46a or 46b in the end member 46 to cause diversion of trays either to the left or the right, respectively.

While the apparatus hereinbefore described is effectively adapted to fulfill the objects stated, we do not intend to confine our invention to the particular preferred embodiment of article diverter system disclosed inasmuch as it is susceptible of various modification without departing from the scope of the appended claims.

We claim:

1. In a conveyor system having a conveyor of the belt-driven roller type for conveying articles therealong and having a plurality of article supporting and conveying rollers spaced longitudinally thereof, a diverter mechanism mounted at a selected point along the conveyor between a pair of rollers, said diverter mechanism comprising at least one diverting wheel and a diverting wheel supporting assembly supporting said wheel for free rotation on a horizontal axis and at a level wherein the upper portion of the wheel extends slightly above the upper lever of the adjacent conveyor rollers, an actuatable parallelogram type structure of elongated substantially rectangular configuration comprising a pair of side members and a pair of end members joined to one another to afford articulated corners for said structure and having said wheel supporting assembly mounted thereacross for pivoting said wheel and its supporting assembly about the vertical midpoint of the wheel, means mounting said structure transversely of the conveyor for pivotal movement at the midpoint of each end of said structure to afford actuation of the same and electroresponsive means for actuating said structure to pivot said wheel to a predetermined angle toward a side of the conveyor thereby to turn and divert a traveling article off the conveyor.

2. The invention defined in claim 1, wherein said wheel supporting assembly comprises means for resiliently biasing said wheel upwardly to a position wherein the extreme upper rounded portion of the wheel is slightly above the upper level of the adjacent conveyor rollers to engage an article, and said wheel being depressible against the resilient force of said biasing means under the weight of an article passing thereover.

3. In a conveyor system having a conveyor of the belt-driven roller type for conveying articles therealong and having a plurality of article supporting and conveying rollers spaced longitudinally thereof, a diverter mechanism mounted at a selected point along the conveyor between a pair of rollers, said diverter mechanism comprising a diverting wheel and a diverting wheel supporting assembly supporting said wheel for free rotation on a horizontal axis and at a level wherein the upper portion of the wheel extends slightly above the upper level of the adjacent conveyor rollers, an actuatable parallelogram type structure having articulated corners and having said wheel supporting assembly mounted thereacross for pivoting said wheel and its supporting assembly about the vertical midpoint of the wheel, means mounting said structure transversely of the conveyor for pivotal movement at the midpoint of each end of said structure to afford actuation of the same, and electroresponsive means for actuating said structure to pivot said wheel to a predetermined angle toward a side of the conveyor thereby to turn and divert a traveling article off the conveyor, said wheel supporting assembly comprising means for resiliently biasing said wheel upwardly to a position wherein the extreme upper rounded portion of the wheel is slightly above the upper level of the adjacent conveyor rollers to engage an article, said wheel being depressible against the resilient force of said biasing means under the weight of an article passing thereover, and said wheel supporting assembly further comprising means effective when said wheel is in its straight ahead non-diverting position for permitting depression of said wheel to the level of the adjacent conveyor rollers whereby said wheel engages the belt and acts as a roller to drive the article, and means effective when said wheel in its angular diverting position for limiting depression of said wheel thereby to prevent said wheel from engaging and sliding on the belt.

4. The invention defined in claim 3, wherein said means limiting depression of said wheel in its diverting position comprises cam means effective to raise said wheel from its depressed position when said diverter device is actuated to its diverting position while an article is passing over said wheel.

5. In a conveyor system having a conveyor of the belt-driven roller type for conveying articles therealong and having a plurality of article supporting and conveying rollers spaced longitudinally thereof, a diverter mechanism mounted at a selected point along the conveyor between a pair of rollers, said diverter mechanism comprising a diverting wheel and a diverting wheel supporting assembly supporting said wheel for free rotation on a horizontal axis and at a level wherein the upper portion of the wheel extends slightly above the upper level of the adjacent conveyor rollers, an actuable parallelogram type structure having articulated corners and having said wheel supporting assembly mounted thereacross for pivoting said wheel and its supporting assembly about the vertical midpoint of the wheel, means mounting said structure transversely of the conveyor for pivotal movement at the midpoint of each end of said structure to afford actuation of the same, and electroresponsive means for actuating said structure to pivot said wheel to a predetermined angle toward a side of the conveyor thereby to turn and divert a traveling article off the conveyor, said parallelogram type structure comprising a pair of elongated side members and a pair of relatively shorter end members, means pivotally connecting first ends of said end members to opposite ends of one of said side members and pivotally connecting the other ends of said end members to opposite ends of the other side member, means pivotally connecting the opposite ends of said wheel supporting assembly to said side members to support said assembly parallel to the end members, and pivot means at the midpoint of each said end member for mounting said structure transversely of the conveyor.

6. The invention defined in claim 5, wherein said pivot means comprises a pair of brackets extending toward one another from opposite sides of the conveyor and each having a hole therein, and a depending pivot pin at the midpoint of each said end member, one of said pivot pins journaled in the hole in each said bracket.

7. The invention defined in claim 6, wherein said electroresponsive means comprises an electromagnet mounted at one side of the conveyor, an actuating member operable by said electromagnet and having a driven end connected to said electromagnet, and means pivotally connecting the other driving end of said actuating member to one of said end members of said parallelogram type structure at a point spaced from the pivot pin thereof.

8. In a conveyor system having a conveyor of the roller type for conveying articles therealong and having a plurality of article supporting and conveying rollers spaced longitudinally thereof, a diverter device mounted at a selected point along the conveyor in place of one conveyor roller, said diverter device being readily detachable and being mountable at any desired point along the conveyor, said diverter device comprising a plurality of diverting wheels and a corresponding plurality of diverting wheel supporting assemblies arranged in a row across the conveyor, said supporting assemblies supporting the respective wheels for free rotation on horizontal axes and resiliently biasing said wheels to a level wherein the upper portion of each wheel extends slightly above the upper level of the adjacent conveyor rollers, an elongated parallelogram type structure of substantially rectangular configuration having articulated corners and having said wheel supporting assemblies mounted thereacross in spaced parallel relation to one another for supporting said wheels and supporting assemblies and for pivoting the same about the vertical midpoint of each wheel, means supporting said structure at its ends transversely of the conveyor for pivotal movement at the midpoint of each end thereof to afford actuation of the same comprising a fixed but readily detachable bracket extending inwardly from each side of the conveyor for pivotally supporting the opposite ends of said structure, and electroresponsive means mounted on one side of the conveyor and comprising an actuating arm connected to an end of said structure for actuating said structure to pivot said wheels to a predetermined angle toward a side of the conveyor thereby to divert traveling articles off the conveyor.

9. In a conveyor system having a conveyor of the roller type for conveying articles therealong and the conveyor having a pair of side frame members provided with spaced notches for supporting the ends of the axles of a plurality of article supporting and conveying rollers spaced longitudinally thereof, a diverter device mounted at a selected point along the conveyor in place of one conveyor roller in the opposite frame member notches thereof, said diverter device comprising a plurality of diverting wheels and a corresponding plurality of diverting wheel supporting assemblies supporting the respective wheels for free rotation on horizontal axes and resiliently biasing the same to a level wherein the upper portion of each wheel extends slightly above the upper level of the adjacent conveyor rollers, an elongated parallelogram type structure having articulated corners and having said wheel supporting assemblies mounted thereacross in spaced parallel relation to one another for supporting said wheels and supporting assemblies and for pivoting the same about the vertical midpoint of each wheel, means mounted in said opposite notches for supporting said structure transversely of the conveyor for pivotal movement at the midpoint of each end thereof to afford actuation of the same, and electroresponsive means for actuating said structure to pivot said wheels to a predetermined angle toward a side of the conveyor thereby to divert traveling articles off the conveyor, said parallelogram type structure comprising a pair of elongated side members each having a channel-shaped cross-section to provide an upper and a lower flange, a pair of relatively shorter end members, means pivotally connecting first ends of said end members to opposite ends of the upper flange of one of said side members to support the latter and pivotally connecting the other ends of said end members to opposite ends of the upper flange of the other side member to support the latter, and means pivotally connecting the opposite ends of said wheel supporting assemblies to said side members between and to the upper and lower flanges thereof.

10. The invention defined in claim 9, together with a pair of brackets detachably mounted in said opposite frame member notches and extending toward one another from opposite sides of the conveyor, each said bracket having a hole therein, and a pivot pin depending from the midpoint of each said end member, said pivot pins being journaled in said holes in the respective brackets to support said structure transversely of the conveyor.

11. The invention defined in claim 9, wherein each said wheel supporting assembly comprises upper and lower brackets connected in spaced parallel relation to one another to form a bracket assembly which is pivotally connected at the opposite ends thereof to said side members between the upper and lower flanges thereof, a U-shaped lever having a yoke portion and a pair of leg portions, means pivoting said leg portions adjacent a first end of said parallel bracket assembly whereby said U-shaped lever extends between said parallel brackets, means mounting one of said diverter wheels at an intermediate point between said leg portions for rotation on a horizontal axis, said wheel being bodily movable when said U-shaped lever is pivoted, tension spring means biasing said U-shaped lever upwardly wherein said yoke portion stops against the upper parallel bracket, and apertures in said upper and lower brackets providing clearance for the upper and lower portions of said wheel.

12. The invention defined in claim 11, wherein said yoke portion is provided with a depending portion normally freely entering the aperture in said lower parallel bracket without stopping against the lower flange of the adjacent side member when said wheel is depressed in its nondiverting position and for stopping against the lower flange of said adjacent side member to limit depression of said wheel in its diverting position to prevent said wheel from engaging the belt therebelow.

13. The invention defined in claim 12, wherein said depending portion extends from said yoke portion at a predetermined angle away from said lower flange of said adjacent side member, and the opposite side edges of said depending portion form cam surfaces for engaging said lower flange to raise said wheel when said diverter device is actuated to its diverting position when said wheel is depressed under the weight of an article passing thereover.

14. The invention defined in claim 10, wherein said electroresponsive means comprises an electromagnet mounted at one side of the conveyor, an elongated operating member drivingly connected to said electromagnet at one end and having a pivot pin at the other end, and a pair of holes in each said end member, one hole of each pair being adjacent each end of such end member for selectively receiving the pivot pin of the operating member thereby to pivot the diverting wheel either toward the left or toward the right when said electromagnet is energized to retract said operating member.

15. In a conveyor system having a conveyor of the roller type for conveying articles therealong and the conveyor having a pair of side frame members provided with spaced notches for supporting the ends of the axles of a plurality of article supporting and conveying rollers spaced longitudinally thereof, a diverter device mounted at a selected point along the conveyor in place of one conveyor roller in the opposite frame member notches thereof, said diverter device comprising a plurality of diverting wheels and a corresponding plurality of diverting wheel supporting assemblies supporting the respective wheels for free rotation on horizontal axes and resiliently biasing the same to a level wherein the upper portion of each wheel extends slightly above the upper level of the adjacent conveyor rollers, an elongated parallelogram type structure having articulated corners and having said wheel supporting assemblies mounted thereacross in spaced parallel relation to one another for supporting said wheels and supporting assemblies and for pivoting the same about the vertical midpoint of each wheel, means mounted in said opposite notches for supporting said structure transversely of the conveyor for pivotal movement at the midpoint of each end thereof to afford actuation of the same, and electroresponsive means for actuating said structure to pivot said wheels to a predetermined angle toward a side of the conveyor thereby to divert traveling articles off the conveyor, said electroresponsive means comprising an electromagnet having a magnetic plunger movable upwardly when said electromagnet is energized, a pivotal crank operable by said plunger, a pivotal lever and an operating member connected to said lever and extending therefrom for actuating said diverter device and resilient means connecting said crank to said lever, said resilient means allowing operation of said plunger against the force thereof when said lever is immobilized by an article in engagement with the diverting wheels when said electromagnet is energized.

16. The invention defined in claim 15, together with a weight on said plunger for returning the latter to its normal position when said electromagnet is deenergized thereby to return said diverter wheels to their nondiverting position, a tension spring connected between said crank and a fixed point, and means for adjusting the tension in said spring to adjust the combined return force of said weight and said spring to a value sufficient to return said diverter wheels to their nondiverting position.

References Cited in the file of this patent

FOREIGN PATENTS 16,093 of 1907   Great Britain _____ Oct. 29, 1907